US012484883B2

(12) United States Patent
Baiu

(10) Patent No.: US 12,484,883 B2
(45) Date of Patent: Dec. 2, 2025

(54) FUNCTIONALIZED SUPERABSORBENT MATERIAL FOR USE IN LESION PHANTOM

(71) Applicant: Gammex, Inc., Middleton, WI (US)

(72) Inventor: Cristel Baiu, Madison, WI (US)

(73) Assignee: Sun Nuclear Corp., Melbourne, FL (US)

( * ) Notice: Subject to any disclaimer, the term of this patent is extended or adjusted under 35 U.S.C. 154(b) by 1152 days.

(21) Appl. No.: 17/348,258

(22) Filed: Jun. 15, 2021

(65) Prior Publication Data

US 2021/0386407 A1    Dec. 16, 2021

Related U.S. Application Data

(60) Provisional application No. 63/039,187, filed on Jun. 15, 2020.

(51) Int. Cl.
*A61B 8/00*   (2006.01)
*A61K 49/22*  (2006.01)

(52) U.S. Cl.
CPC .............. *A61B 8/587* (2013.01); *A61B 8/481* (2013.01); *A61K 49/22* (2013.01)

(58) Field of Classification Search
None
See application file for complete search history.

(56) References Cited

U.S. PATENT DOCUMENTS

| | | | |
|---|---|---|---|
| 5,625,137 A | 4/1997 | Madsen et al. | |
| 5,670,719 A | 9/1997 | Madsen et al. | |
| 6,352,860 B1 | 3/2002 | Madsen et al. | |
| 6,635,486 B2 * | 10/2003 | Madsen .................... | A61B 8/08 324/308 |
| 8,288,583 B2 * | 10/2012 | Boehmke ................ | C07C 67/60 560/217 |
| 8,678,831 B2 * | 3/2014 | Trotta ..................... | B29C 39/10 434/273 |

OTHER PUBLICATIONS

Hellerbach A, Schuster V, Jansen A, Sommer J. MRI phantoms—are there alternatives to agar?. PloS one. Aug. 5, 2013;8(8):e70343. (Year: 2013).*
Packett RD, Brown PJ, Popli GS, Scott Gayzik F. Development and Validation of a Brain Phantom for Therapeutic Cooling Devices. Journal of Biomechanical Engineering. May 1, 2017;139(5):051007. (Year: 2017).*
Dunmire B, Kucewicz JC, Mitchell SB, Crum LA, Sekins KM. Characterizing an agar/gelatin phantom for image guided dosing and feedback control of high-intensity focused ultrasound. Ultrasound in medicine & biology. Feb. 1, 2013;39(2):300-11. (Year: 2013).*
Baiu, C. et al., "Resolution Properties of Multi-Row Array Transducers Assessed Using Spherical Void Phantoms", European Society of Radiology, Poster No. C-0879, retrieved from https://epos.myesr.org/poster/esr/ecr2019/C-0879 on Jun. 15, 2021.
Doblhoff, Georg et al., "Recognising Small Image Quality Differences for Ultrasound Probes and the Potential of Misdiagnosis Due to Undetected Side Lobes", Ultrasound, vol. 25(1), pp. 35-44, published 2017, https://www.ncbi.nlm.nih.gov/pmc/articles/PMC5308391/ on Jun. 15, 2021.
Goldstein, Albert, "Slice Thickness Measurements", Journal of Ultrasound in Medicine, vol. 7, pp. 487-498, published 1988.
Horie, K. et al., "Definitions of Terms Relating to Reactions of Polymers and to Functional Polymeric Materials", Pure and Applied Chemistry, vol. 76, No. 4, pp. 889-906, published 2004.
Madsen, Ernest L. et al., "Low-Echo Sphere Phantoms and Methods for Assessing Imaging Performance of Medical Ultrasound Scanners", Ultrasound in Medicine & Biology, vol. 40, No. 7, pp. 1697-1717, published Jul. 2014, retrieved from https://www.ncbi.nlm.nih.gov/pmc/articles/PMC4217281/ on Jun. 15, 2021.
Satrapa, J. et al., "Quality Control Automation of Ultrasound Scanners", Tissue Characterization Consulting, retrieved from https://www.medizintechnik-lange.de/wp-content/uploads/attachments/quality-control-automation.pdf on Jun. 15, 2021.
Sobrido Sampedro, C. et al., "Breast Ultrasound Nowadays: An Individualized Technique", European Society of Radiology, Poster No. C-2856, retrieved from https://epos.myesr.org/poster/esr/ecr2019/C-2856 on Jun. 15, 2021.
"Sono408 Spherical Lesion Phantom", Diagnostics, Gammex, Inc.
Madsen, Ernest L. et al., "Spherical Lesion Phantoms for Testing the Performance of Elastography Systems", Physics in Medicine & Biology, vol. 50, No. 23, published Nov. 16, 2005, retrieved from https://www.ncbi.nlm.nih.gov/pmc/articles/PMC3769962/ on Jun. 15, 2021.
"Ultrasonics—Pulse-Echo Scanners—Low-Echo Sphere Phantoms and Method for Performance Testing of Gray-Scale Medical Ultrasound Scanners Applicable to a Broad Range of Transducer Types", Technical Specification, International Electrotechnical Commission, published 2015.
Zohuriaan-Mehr, Mohammad J. et al., "Superabsobent Polymer Materials: A Review", Iranian Polymer Journal, vol. 17, No. 6, pp. 451-477, published 2008.

* cited by examiner

*Primary Examiner* — Nissa M Westerberg
(74) *Attorney, Agent, or Firm* — Andrus Intellectual Property Law, LLP

(57) ABSTRACT

Contrast targets for medical imaging are disclosed herein which include a granule of superabsorbent polymer (SAP) material. The granule of SAP material has absorbed and formed crosslinks with a hydrogen-containing liquid to form an expanded SAP particle with at least one predetermined medical imaging physical property.

21 Claims, 5 Drawing Sheets

FUNCTIONALIZED SUPERABSORBENT MATERIAL FOR USE IN LESION PHANTOM

CROSS-REFERENCE TO RELATED APPLICATION

The present application claims priority of U.S. Provisional Patent Application No. 63/039,187, filed on Jun. 15, 2020, the content of which is hereby incorporated herein by reference in its entirety.

BACKGROUND

Ultrasonic imaging is an important and routine procedure in medical evaluation and diagnosis. The images generated by an ultrasound scanner are based on the reflection of the waves by body structures. These structures have physical sonic characteristics (e.g. speed of sound transmission, attenuation, backscatter), locations, and geometrical characteristics that influence the image quality. Ultrasound scanners have recommended preset values for functions for example frequency, dynamic range, power output, time gain compensation and others for average body structures. These presets are modified by a sonographer based on the particular case. Given that, quality assurance of the images obtained from ultrasonic devices is needed. Ultrasound frequency, beam shape, contrast, field of view, focusing zone, power output, dynamic range, and/or the other available imaging parameters, must be controlled to achieve a desired image. Lobbing of the ultrasound beam and differences in the sizes, shapes, and acoustic properties of the imaging targets can influence the resulting image.

Many tumors and blood vessels are anechoic, however, in an ultrasound image, anechoic masses may not appear to be echo free as the side lobes fill the voids from the surrounding masses with echoes. This can partially or completely obscure the anechoic masses. This most frequently occurs in the near field. If the power in the side lobes reaches the level of the main lobe, the edges of the void can be identified, but the inside of the void will be filled with echoes. This is described in Doblhoff, et al. "Recognizing Small Image Quality Differences for Ultrasound Probes and the Potential of Misdiagnosis due to Undetected Side Lobes," *Ultrasound* 2017, Vol. 25(1) 35-44, which is incorporated by reference herein in its entirety. This means that in spite of high spatial resolution, the voids risk being lost due to low spatial contrast resolution.

With a variety of imaging parameters that must be tuned to the individual patient, ultrasound imaging requires technical adjustments of the imaging presets that are specific to each patient, imaging locations, or diagnostic context. Sampedro, et al. "Breast Ultrasound Nowadays: an Individualized Technique," European Society of Radiology Poster No. C-2856 (2019), which is incorporated by reference herein in its entirety, provides additional information regarding current clinical ultrasound imaging techniques. Furthermore, it is common at least in some regions for ultrasound images to be interpreted by a person/radiologist in a room remote from where the technician/sonographer acquires the images from the patient.

A 2D image on a scanner monitor represents the average of the echo signals included in the scan plane at each image depth. The thickness of the scan plane, known as slice thickness, can be modified with electronic focusing. The contrast of the same lesion will differ if the slice thickness differs because of the location of the lesion and/or slice thickness change with electronic focusing. This is described in Goldstein "Slice Thickness Measurements" *J. Ultrasound Med.* 7:487-798, 1988, which is incorporated herein by reference in its entirety.

Low scatter spherical lesion phantoms are useful tools for assessing detailed spatial resolution of ultrasound scanners, including those equipped with multi-row, linear and curvilinear arrays, and for tuning system presents for specific applications. Current commercially available lesion phantoms with spherical targets arranged in a plane are costly to manufacture and are difficult to use because of the need for precise alignment of the scan plane with the plane of the lesion centers.

Therefore there are needs for phantoms that can be used in settings tuning, quality, calibration, or investigation of ultrasound systems. Phantoms like the Sono408 Spherical Lesion Phantom, available from Gammex, Inc, provide spherical lesions of a low echogenicity, without distal enhancement or shadowing. These spherical lesions are suspended in a material that mimics human tissue. Such phantoms enable the measurement of spatial resolution in the axial, lateral, and elevational directions. Further examples of such phantoms are described in U.S. Pat. No. 5,625,137, entitled "Very Low Scatter Liquid and Solid Tissue Mimicking Material for Ultrasound Phantoms and Method of Making the Same," which is incorporated herein by reference in its entirety. Further materials that may be used in the anechoic spherical phantoms have been developed and are described in Madsen, et al. "Low-Echo Sphere Phantoms and Methods for Assessing Imaging Performance of Medical Ultrasound Scanners," *Ultrasound Med. Biol.* 2014 July; 407(7): 1697-1717; and Madsen, et al. "Spherical Lesion Phantoms for Testing the Performance of Elastography Systems," *Ultrasound Med. Biol.* 2005 Dec. 21; 50(24): 5983-5995, which are incorporated by referenced in their entireties. Those anechoic spheres are exemplarily constructed of a milk-agar mixture that is molded and cured into a spherical shape.

However, current systems for lesion phantoms and methods of constructing these phantoms are time consuming, expensive, and specific to the spatial resolution in ultrasound imaging and/or measurements. Therefore, solutions that provide for flexibility in phantom design and construction are desired to produce new phantoms for quality control, calibration, and/or investigation in an economical manner.

BRIEF DISCLOSURE

Systems and methods whereby contrast targets are produced in manners that can create accurate contrast targets with diverse acoustic and other perceptible properties are disclosed herein.

Contrast targets for medical imaging are disclosed herein which include a granule of superabsorbent polymer (SAP) material. The granule of SAP material has absorbed and formed crosslinks with a hydrogen-containing liquid to form an expanded SAP particle with at least one predetermined medical imaging physical property.

In other examples, the physical property is a diameter of the expanded SAP particle. The physical property may be at least one of a speed of sound transmission, a radiopacity, or a color. The hydrogen-containing liquid may be a first hydrogen-containing liquid and may include a second hydrogen-containing liquid wherein the granule of SAP material has also absorbed and formed crosslinks with the second hydrogen-containing liquid. The hydrogen-containing liquid may be selected from a list that includes water, n-propyl alcohol, ethylene glycol, and glycerol.

The hydrogen-containing liquid may also be a solution that comprises the hydrogen-containing liquid and at least one additive material to provide at least one predetermined medical imaging physical property. The additive material may be sodium chloride. The predetermined physical property may be a diameter of the expanded SAP particle. The additive material may be copper sulfate or potassium iodide. The predetermined physical property may be T1 relaxation time for MRI or attenuation for x-ray imaging. The additive material may be a compound that comprises at least one of sodium calcium, potassium, iodine, copper, gadolinium, sulfur, or salts thereof. The at least one additive material may include a first additive material and a second additive material, wherein physical properties of the first additive material are different from the physical properties of the second additive material.

An example of a medical imaging phantom includes a plurality of contrast targets. Each contrast target of the plurality of contrast targets includes a granule of superabsorbent polymer (SAP) material wherein the granule of SAP material has absorbed and formed crosslinks with a hydrogen-containing liquid to form an expanded SAP particle with at least one predetermined medical imaging physical property. The plurality of contrast targets are surrounded in a background material.

In further example of the medical imaging phantom, the plurality of contrast targets include a first portion of contrast targets of the plurality of contrast targets and a second portion of contrast targets of the plurality of contrast targets, wherein the contrast targets of the first portion have at least one physical property different from at least one physical property of the contrast targets of the second portion. The background material may comprise a plurality of expanded SAP particles which each comprise a granule of SAP material that has absorbed and formed crosslinks with a hydrogen-containing liquid, wherein the plurality of expanded SAP particles of the background material have at least one physical property different from a physical property of the expanded SAP particles of the plurality of contrast targets. The medical imaging phantom may be configured for use as a phantom for at least one of ultrasound, CT, MRI, or photoacoustic imaging. The plurality of contrast targets may include between 20%-80% of a combined volume of the contrast targets and the background material.

The expanded SAP particles may have a melting point greater than 100° C. or greater than 200° C. The expanded SAP particles may further have a delinking temperature 100° C. or greater than 200° C. The background material of the medical imaging phantom may have a melting point greater than 100° C. or greater than 200° C. The hydrogen-containing liquid may be ethylene glycol or glycerol. The background material may be one of polyurethane, silicone, or thermoplastic.

A method of constructing a medical imaging phantom includes exposing granules of superabsorbent polymer (SAP) material to a hydrogen-containing liquid. The hydrogen containing liquid is absorbed into the granules of SAP material and forms crosslinks between the hydrogen-containing liquid and the SAP material. The granules of SAP material expand with the absorbed hydrogen containing liquid to form expanded SAP particles having at least one predetermined medical imaging physical property. The expanded SAP particles are sorted by size. The expanded SAP particles are located within a background material, wherein the background material has a melting point greater than 100° C.

DETAILED DISCLOSURE

Figure 1:
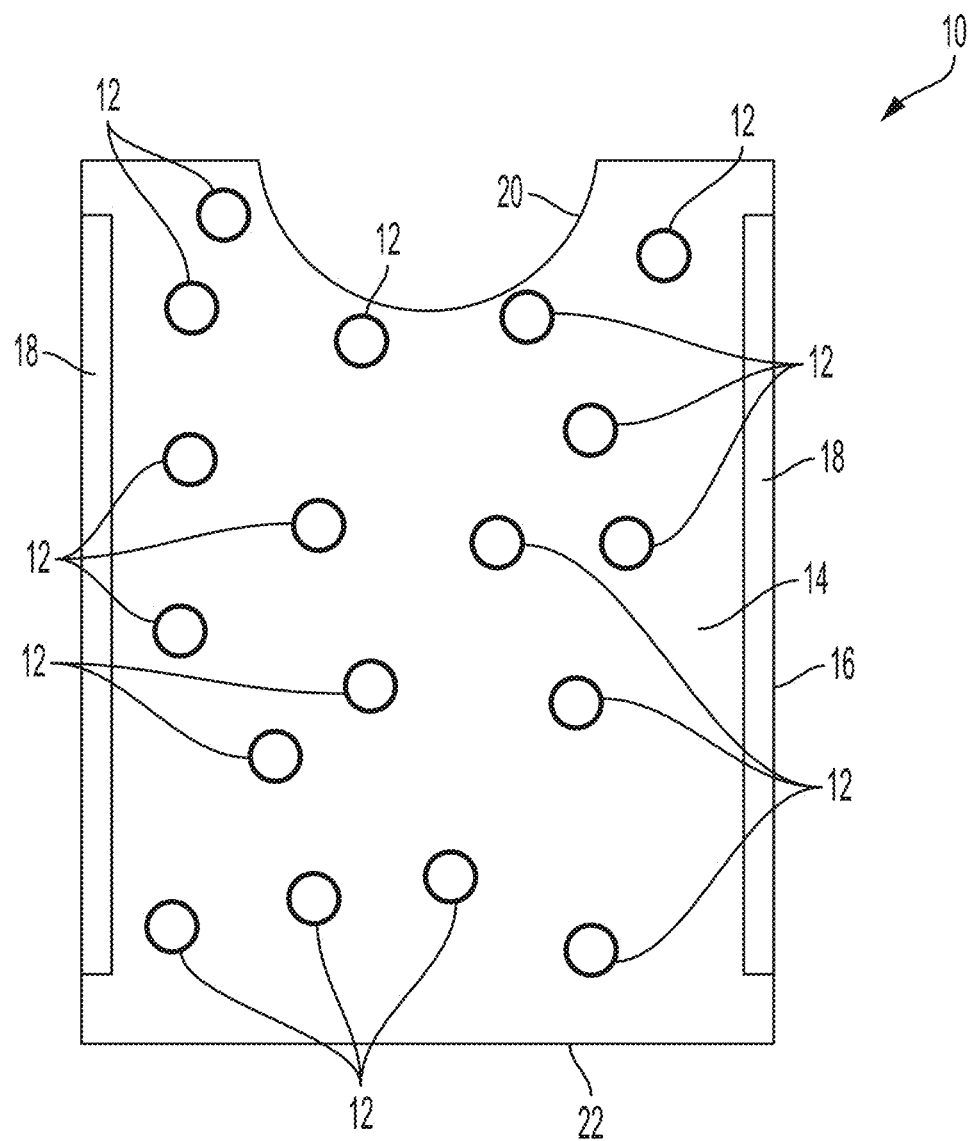
FIG. 1 is a schematic diagram of a spherical lesion phantom.

Superabsorbent Polymers (SAP) are a class of materials that are hydrophilic networks that can absorb and retain large amounts of liquids, including but not limited to water, alcohols, and solutions thereof, relative to the weight of the SAP material. SAP materials are known to absorb at ratios between 50:1 and 1000:1 w/w or greater. SAP materials can be synthetic or naturally based with the most common forms of SAP materials being derivatives of acrylic acid (AA) and acrylamide (AM) and salts thereof. SAP materials are able to absorb these significant amounts of liquid as the SAP material forms hydrogen crosslinks with the liquid, forming a stronger bond than produced by surface tension and adhesion.

In embodiments disclosed herein granules of SAP material, or SAP granules, are used to form the structure of contrast targets in medical imaging phantoms. The granules may exemplarily be between 0.06 mm and 10 mm in diameter, although other sizes may be used as well. These SAP granules are placed into contact with a hydrogen-containing liquid solution. The hydrogen-containing liquid solution forms crosslinks with the SAP material of the SAP granule to form an expanded SAP particle. The crosslinked hydrogen-containing liquid solution imparts acoustical, photo, radiographic, and/or other properties into the resulting expanded SAP particle. The examples of ultrasound phantoms will be used primarily herein, but it will be recognized that similar processes may be used to form other types of contrast targets for phantoms for other types of imaging modalities, for example MR or CT, or multi-modality phantoms.

In exemplary embodiments disclosed herein, SAP lesion phantoms include contrast targets of the same sonic characteristics (e.g. speed of sound transmission, attenuation, and/or acoustic reflectivity) of varying shapes, sizes, or diameters at different depths and locations within the phantom. Granules of a selected SAP material are treated with a hydrogen-containing liquid, for example, water or alcohol, or a solution of a hydrogen-containing liquid in combination with one or more additive material to further impart a physical property on the resulting expanded SAP particle, when the hydrogen-containing liquid crosslinks with the SAP material. While water is used as a common example herein, other liquids which form crosslinks with SAP material include n-propyl alcohols, ethylene glycol, acetic acid, glycerol, and others. In examples provided herein, solutions may exemplarily contain at least one additive, for example, sodium chloride which reduces crosslinking and solution absorption, but increases the speed of sound propagation through the expanded SAP particle. In an example, the SAP granules may be sorted prior to or after expansion to select ones spherical in shape, or to select for SAP granules of other shapes and/or sizes. In examples, the SAP granules may be sorted into size ranges.

It will be recognized that the final size of the expanded SAP particle is a function of the starting size of the SAP granule, the specific material of the SAP granule, and the solution or solutions, comprising liquids and additive materials, absorbed by the SAP granules. The size of the SAP granules, the specific materials of the SAP granule and the type and concentration of the solution to which the SAP granules are exposed can be selected to result in expanded SAP particles of a predetermined size and physical properties. Because granules of the same SAP material will absorb at the same volumetric ratios, granules of a known size will fully expand to a known volume given a known liquid and additive material. This can be determined empirically or experimentally to produce contrast targets of the desired size and physical properties. For example, it is recognized that in some applications there is a relationship between contrast target size in a phantom and an ultrasound frequency or frequency band to bet tested with that phantom, for example, with larger diameter contrast targets being used to test lower frequency ultrasound used in deeper tissue imaging. In embodiments, the SAP granules can thus be sorted by size and/or shape prior to expansion and crosslinking, or the expanded SAP particles can be sorted by size and/or shape after expansion and crosslinking. While examples may include expanded SAP particles of 0.1-50 mm diameter, it will be recognized that other sizes of expanded SAP particles larger and smaller than this rage may also be used.

In additional examples, the size of the expanded SAP particles are dependent, and thus controllable, upon the amount of solution absorbed by the SAP granule. As noted above, the content and concentration of the solution can have a direct effect on the absorbent properties of the SAP material. The absorbent properties are controlled by the cross-links in the expanded SAP particle. Valence cations can, for example, impede bonding with water molecules. For a particular SAP material, the absorption ratio is therefore greater for some solutions than other solutions. In an embodiment, for the same sized granules of the same SAP material, the diameter of the resulting expanded SAP particle may be controlled by the concentration of the solution with which the SAP granules are crosslinked. As a demonstrative example, expanded SAP particles having the same SAP material and the same SAP granule size can result in expanded SAP particles having different diameters due to control of the composition of the solution absorbed by the SAP granules to different concentrations of additive (e.g. sodium chloride) in the solution. In this example, an increase in the concentration of sodium chloride in the solution results in a relative decrease in the diameter of the expanded SAP particle compared to no or lower concentration of the additive.

In examples, the type and degree of cross-linkers used to make the SAP material affect the absorbent capacity of the material and the strength and firmness of the expanded particle. In the manufacturing process, a second cross-linking step may be added to cross-link some or all of the SAP material. In an example, the second cross-linking step may seek to treat the exterior of the SAP particles such as to increase the firmness or another property of the outside of the SAP particles to add strength, rigidity, and/or desiccation resistance to the SAP particles. In a first example, a second treatment in a liquid solution with a high sodium chloride content may create an outer layer or skin on the expanded SAP particle, which imparts some additional strength and durability to the expanded SAP particle. In another example, a liquid solution with a concentration of potassium iodide may be used in the cross-linking step to create an SAP particle with increased CT contrast. In a still further example, a liquid solution with a concentration of copper sulfate may be used in the cross-linking step to create an SAP particle with a desired MRI properties.

In still further embodiments, the absorbed solution may include multiple constituent materials, with one or more of the materials selected to impart a desired absorption ratio while one or more other materials selected to impart another physical effect on the resulting expanded SAP particle. Such physical effect may be one that is an acoustic property, but may also be a different type of imaging property, be it optical (e.g. color or luminescence), radiographic (radiopacity), or magnetographic properties for MRI applications. In these embodiments, additives, for example dyes, pigments, potassium iodine, and others can be combined to produce contrast targets that are detectable across multiple imaging modalities, including, but not limited to ultrasound, photographic, photoacoustic, x-ray, computed tomography (CT), elasticity measurements, and magnetic resonance (MR) imaging. In a still further example, expanded SAP particles may further be used in anthropomorphic phantoms or palpation training tools, for example, comparatively stiff expanded SAP particles can be embedded in a comparatively softer background material (e.g. natural or synthetic gelatine) to mimic lesions within breast tissue.

Examples of additives to the solution include, but are not limited to sodium, calcium, potassium, iodine, copper, gadolinium, sulfur, and salts thereof.

Contrast targets formed in the manners as described above are positioned within a phantom, for example surrounded by a background material as the phantom base. In an exemplary embodiment, the background material may be tissue mimicking (TM) gel. The TM gel may be for example as described in the references cited above, and may exemplarily exhibit the acoustic properties of human tissue, for example liver tissue or breast tissue. In examples one or both of the background material and/or the contrast targets may present tissue mimicking properties, and may exhibit properties of different types of tissue. FIG. 1 depicts an exemplary embodiment of a spherical lesion phantom 10 that includes spherical contrast targets 12 suspended or otherwise supported or embedded in a background material 14. The phantom 10 is constructed with side walls 16. As previously noted, the background material 14 may be a gel or liquid and therefore a rigid container defined by side walls 16 may be necessary to contain the background material 14 and the spherical contrast targets located therein. The phantom 10 further includes reflectors 18 positioned interior of the walls 16 which serve to redirect the projected ultrasound energy into the interior of the phantom, for example the energy from the side lobes of the ultrasound beam. In embodiments, the reflectors 18 may exemplarily be constructed of glass and/or alumina. The phantom 10 as shown includes a curved scan window 20. While the curved scan window is depicted as having a single radius, it will be recognized that in embodiments, the radius of the scan window 20 may be different along the length of the phantom 10, for example, with a progressively increasing (or decreasing) radius along the length of the phantom 10. As an example, the phantom 10 may optionally further include a flat or planar scan window 22. As depicted in FIG. 1, scan window 22 may be opposite scan window 20.

While previous phantoms have used TM gel as the background material, embodiments of the contrast targets as disclosed herein are not so limited as previous contrast targets and may be used with a wider range of background materials. In examples, the firmness or other physical properties of the expanded SAP particles may be controlled based upon the SAP material selected, the solution absorbed or with a cross-linking surface treatment. Combinations of these techniques can yield contrast targets that resist desiccation when held in other types of materials. In a non-limiting embodiment, the contrast targets may be held in a mineral oil, in room temperature curing polyurethane, or Silicone gels that help to retain the solution within the expanded SAP particle. In other examples, additional expanded SAP particles, although expanded with an alternative solution (e.g. distilled water) and therefore presenting different imaging properties may be used as the background material, with the contrast targets randomly dispersed there between.

TM gels as exemplarily described above may be agar or gelatin based and have a melting point between 40 C and 95 C. Because of this, a background of the melted agar/gelatin based TM gel can be formed about the currently available milk-based contrast spheres. The currently available milk-based contrast spheres limit the available background materials are limited as contact between a background material with a liquid phase above 90 C risks melting and destroying the milk-based contrast spheres. However, in embodiments of the contrast spheres as described herein comprising SAP materials, the expanded SAP particles exhibit higher delinking temperatures than the melting points of agar or gelatin based materials used for backgrounds or contrast targets. The liquid solution absorbed by the SAP material polymerizes with the SAP material, thus for the liquid to be released from the expanded SAP particles, the expanded SAP particles must first de-polymerize, which slows the release of the liquid and makes the expanded SAP particles heat resistant. Therefore, embodiments of the expanded SAP particles disclosed herein can exhibit effective thermal degradation points greater than the boiling point of the liquid solution absorbed in the expanded SAP particles, or similarly, resist release of liquid from the expanded SAP particles at temperatures greater than the boiling point of the absorbed liquid. In an example where water is the base liquid, this can provide a contrast target that resists degradation at temperatures greater than 100° C. As other examples, ethylene glycol has a boiling point of 197° C. and glycerol has a boiling point of 290° C. The polymerization of the SAP material when expanded with these materials similarly produces a contrast target with thermal resistance to degradation above these respective boiling points as well.

A contrast target with these physical properties has the heat resistance high enough for use embedded into thermoplastics such as, but not limited to, PVC background materials. This enables the construction of lesion phantoms and other contrast targets with a rigid and defined shape at room temperature, rather than an amorphous gel that requires further exterior containment. The use of epoxy based resins, polyurethane, silicone, or thermoplastic background materials also further facilitates the use of the disclosed contrast targets in hybrid modality phantoms as these background materials may be available or combined to have suitable properties as background materials for ultrasound, visual, x-ray, CT, elastography, or MR imaging. In still further examples, the solution may include propylene glycol or another solution known to slow the temperature dependent speed of de-polymerization. A contrast target with these physical properties has the heat resistance for use with thermoplastics with melting points for example greater than 100° C., 150° C., 170° C., 200° C., 250° C., 290° C., or 300° C., further increasing the range of polyurethane, epoxy, silicone, or thermoplastic materials which may be used for background material.

Figure 2:
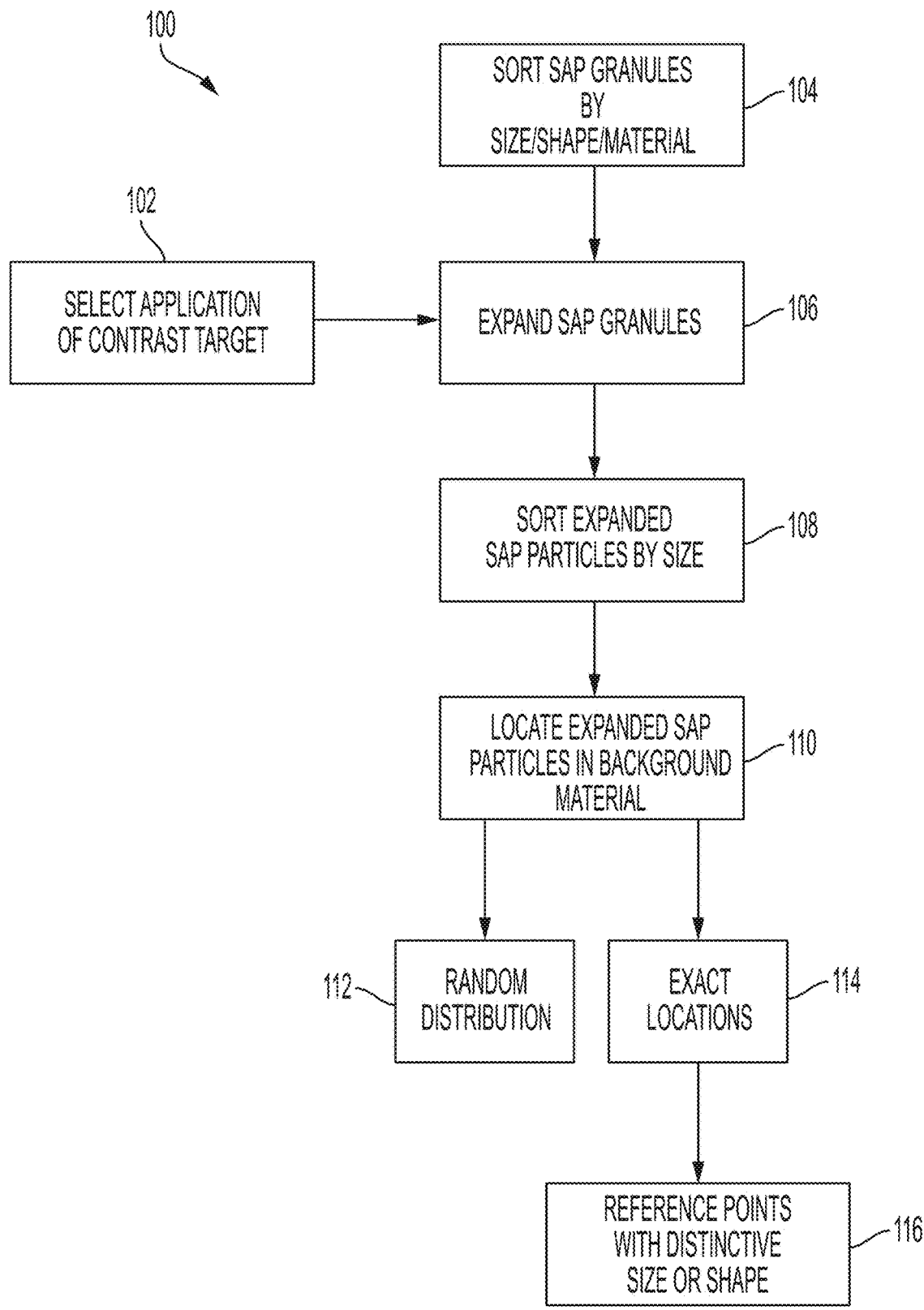
FIG. 2 is a flow chart that depicts a process of forming superabsorbent contrast targets in a phantom.

FIG. 2 is a flow chart that depicts an exemplary embodiment of a method 100 of forming superabsorbent contrast targets in a phantom. The method 100 includes selecting a desired application of the contrast targets at 102. As described herein, depending upon the solution applied to the SAP granules, acoustic, radiographic, magnetic or other physical properties can be imparted onto the SAP material of the granules. In this manner, contrast targets suitable for use with one or more of ultrasound, CT, MRI, X-ray, and others can be created. While the primary example provided herein is the formation of anechoic or hypoechoic ultrasound contrast targets, the inclusion of other solutions, including but not limited to, calcium solutions, potassium solutions, or iodine solutions can provide contrast targets suitable for use with other modalities, including but not limited to CT and MRI. Additionally, contrast targets as described herein may be hyperechoic. In still further examples, anechoic, hypoechoic, and hyperechoic may be relative in nature, compared to the acoustic properties of the background material. Similarly a background material may be selected from materials ranging from anechoic to hypoechoic to hyperechoic. The expanded SAP particles for the contrast targets may be selected to be distinct from the background material in at least one physical property. In examples, solutions comprising calcium and/or potassium, have the effect of increasing the density of the resulting expanded SAP particle. The increased density affects the CT number, but also the speed of sound propagation and/or its attenuation through the material. In examples, it may be desirable to match a density of the background material or to create contrast from the background material. In a further example, n-propyl alcohol has a low density and is readily absorbed by the SAP material, therefore when absorbed by the SAP material results in a comparatively low density expanded SAP particle. On the other hand, glycerol has a higher density compared to water or n-propyl alcohol and when absorbed by the SAP material results in comparatively higher density expanded SAP particles. Furthermore, absorption of glycerol by the SAP material can produce expanded SAP particles with increased MR T1 values.

At 104, the SAP granules are sorted by shape, size, and/or material. In an exemplary embodiment, the SAP granules may be sorted by a supplier and provided on a basis of a preselected shape, size, and/or material. In other embodiments, the SAP granules may be received in bulk and filtered or screened for example to separate the granules based upon size. As noted above, contrast targets as disclosed and used herein may be for use in phantoms for any of a variety of imaging modalities. Therefore, the selection of the desired application of the resulting contrast targets may further inform the sorting and/or selection of SAP granules with a particular shape/size/material so as to result in a contrast target having physical properties falling within desired ranges for those properties.

The selected SAP granules are expanded at 106 by absorbing a liquid selected to impart the physical properties into the resulting expanded SAP particles once the liquid is crosslinked with the SAP material. As explained above, the absorbance of the SAP granules is a function of the selected SAP material and the composition of the absorbed liquid. For a given SAP material and granule size, the final expanded SAP particle diameter and firmness is a function of the absorbed solution whereby distilled water or alcohol may be more readily absorbed resulting in a larger and less firm expanded SAP particles, given a saturating volume of the solution, while ethylene glycol, glycerol, and/or the incorporation of Sodium, Iodine, Calcium, Potassium, thereof, or other additives reduce the absorption of the solution by the SAP material compared to distilled water or alcohol, but also impart other physical characteristics including size density, acoustic, radiographic, magnetic, or elasticity of the expanded SAP particle once the SAP material is crosslinked with the compositions of the solution.

As previously noted, the expansion of the SAP granules may include a multiple-step process whereby the SAP granules are exposed to a sequence of two or more solutions to further impart multiple qualities to the expanded SAP particles, (e.g. low density and exterior firmness).

At 108 the expanded SAP particles may be sorted by final size or shape, for example by screening. In some embodiments, expanded SAP particles of particular size and/or shape may be needed as a contrast target in a phantom. As will be discussed below, such expanded SAP particles may be used as reference points. While in other embodiments as described below, expanded SAP particles within a predetermined distribution of size and/or shape maybe used as contrast targets in phantoms as well. Thus, any sorting or selection performed at 108 is in the context of the final phantom to be produced. While some SAP granules may be spherical (as used in the current example), other SAP granules may be other shapes, resulting in expanded SAP particles having other shapes, including cubic or cylindrical while still others may be lobular which may mimic tumor physiology.

At 110, selected expanded SAP particles are located in a background of a tissue mimicking (TM) material to form a phantom. As noted above, oils, for example mineral oil or silicone oil, gels, or polyurethane, silicone, or thermoplastic materials may be used as background materials. In still further embodiments, expanded SAP particles expanded with solutions of, for example distilled water or saline, may be used as the background material. In such examples, the expanded SAP particles Embodiments that use oils, gels, or expanded SAP particles may thus require a solid case to contain the background material and the contrast targets. In other embodiments, however, as noted above, embodiments of the contrast targets as described above can be constructed with melting points above the liquid phase temperatures of polyurethane, silicone, or thermoplastic materials, and thus may be constructed to produce solid background materials/phantoms at room temperature/operating conditions.

The expanded SAP particles may be located within the background material to achieve a particular contrast target concentration or ratio of contrast target to background material. In an example, the contrast target concentration can be expressed as a volumetric percentage of the phantom comprised of contrast targets to the volumetric percentage comprises of background material. While in some examples, a phantom as described herein may volumetrically comprise less than 20% contrast targets, it has been discovered that the following ranges of the composition of the phantom being contrast targets present advantages as will be described in further detail herein, including between 10%-30%, 15%-25%, 20%-80%, 30%-70%, 20%-40%, 40%-60%, 60%-80% with the balance being background material, which may include expanded SAP particles used as background material. As will be presented in further detail herein, some currently available phantoms are limited by presenting few contrast targets.

As noted above, the distribution of the contrast targets within the background material may be a random distribution at 112. The random distribution may be a distribution of locations of the contrast targets within the background material, but may also include a distribution of shapes and sizes of contrast targets.

In other embodiments, the contrast targets may be positioned within the background material at specific locations or at specific spatial relations between contrast targets at 114. In exemplary embodiments, the contrast targets may be positioned and held within the background material to represent particular imaging depths or volumetric density of individual contrast targets. Some phantoms may include a combination of specifically located contrast targets and randomly distributed contrast targets. In still further examples, contrast targets having varying physical characteristics may be located relative to other similar contrast targets or may be located in manners so as to provide a phantom usable across two or more imaging modalities. Related to this, contrast targets that provide reference points may be located within the phantom at 116. The reference point contrast targets may differ from other contrast targets in size, shape, or physical properties and/or may be provided at a specific expected location. These reference point contrast targets may have physical characteristics that make them distinctive in multiple imaging modalities to support a hybrid use phantom and to correlate images acquired in two different imaging procedures.

Figure 3:
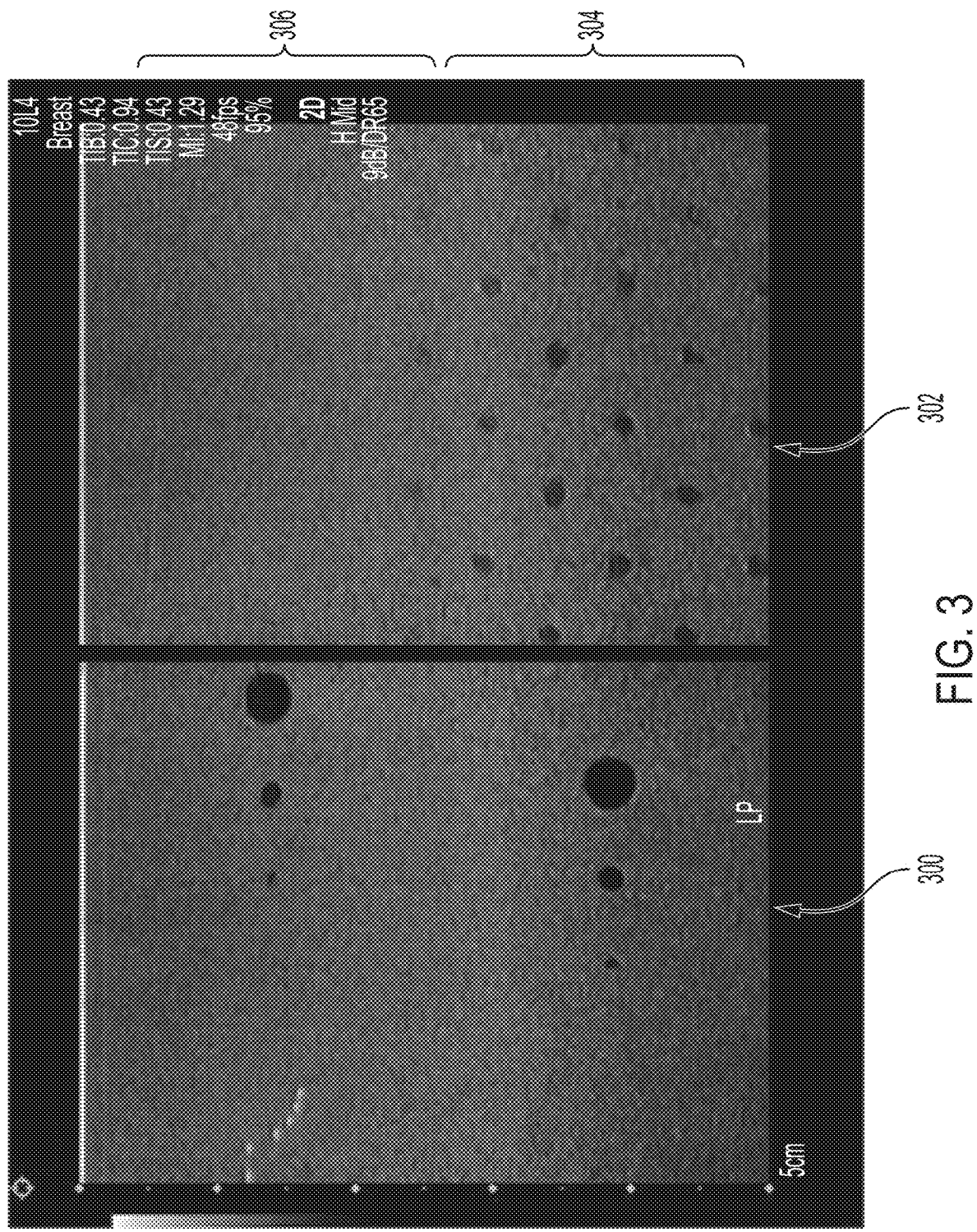
FIG. 3 is an example of an ultrasonic images of contrast targets.

Baiu, et al. "Resolution Properties of Multi-row Array Transducers Assessed Using Spherical Void Phantoms," European Society of Radiology Poster No. C-0879 (2019), discloses challenges of contrast loss in variable TFD imaging of spherical contrast targets, and is incorporated by reference herein in its entirety. FIG. 3 is an example of an ultrasonic image 300 of 0.1 mm diameter strings and 1, 2, and 4 mm diameter cylinders and an ultrasonic image 302 of regularly spaced 2 mm spheres, for example as provided by imaging a Sono408 phantom. Both images were taken with the same imaging parameters, for example, B-mode images using the same transmit focus settings. This comparatively depicts an example of the above-noted challenge with a loss of contrast due to slice thickness. In 300, the cylinders are visible both in a shallow slice 306 (e.g. 1.5 cm depth) and a deeper slice 304 (e.g. 4 cm depth). However, when the array of 2 mm spheres are imaged, the 2 mm diameter spheres in the deep slice 304 are visible while the spheres in the shallow slice 306 are not. This is due to the size and geometry of the cylinders versus the spheres. Had an imaging device been calibrated, or imaging presets defined, solely from the phantom producing image 300, the loss of contrast in the shallow depths would have not been noted.

Figure 4:
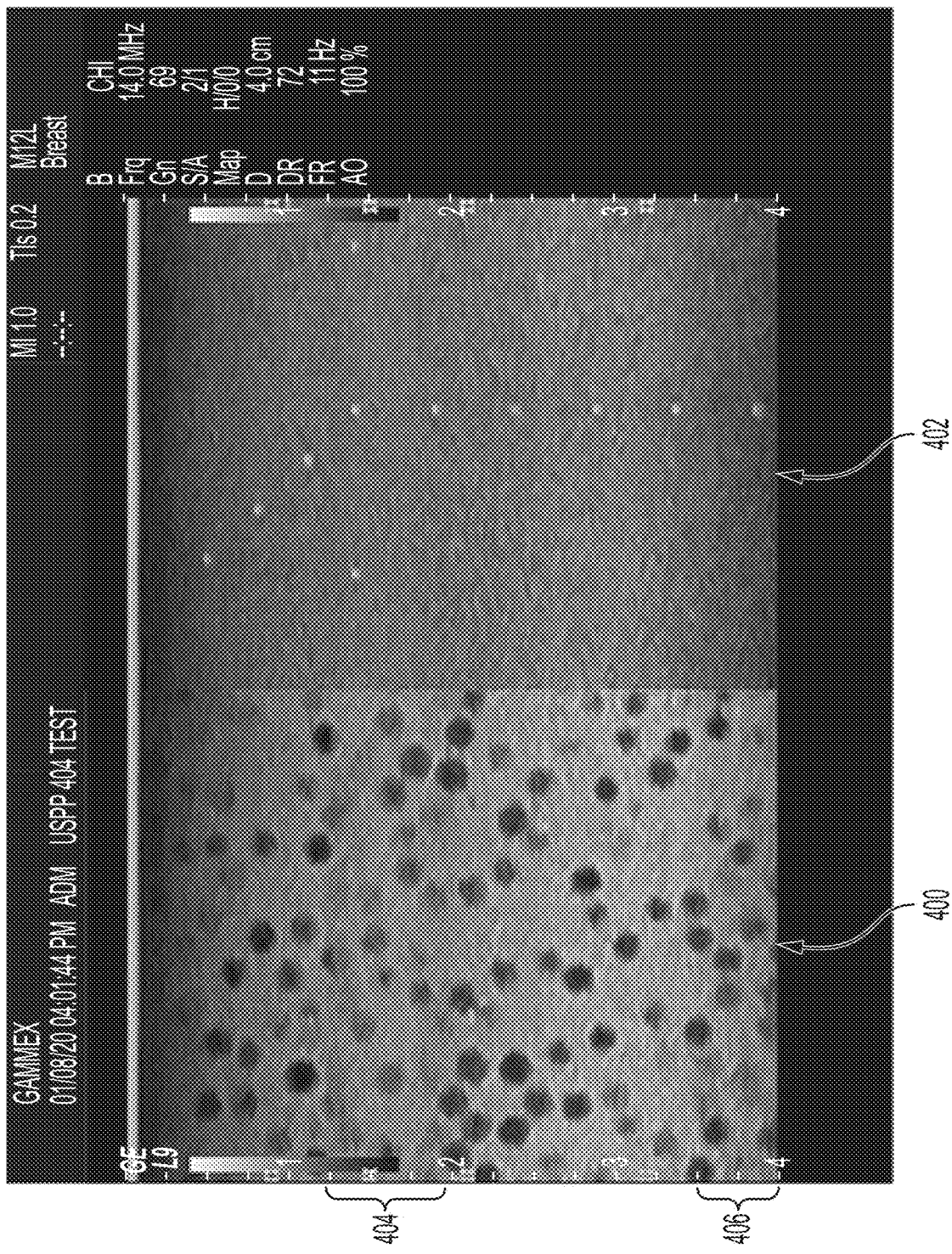
FIG. 4 is another example of ultrasonic images of contrast targets.

FIG. 4 is an example of ultrasonic images depicting a comparative example of an image 400 of a random distribution of a high density of spherical SAP contrast targets as described herein to an image 402 of a number of 0.1 mm strings at regular decreasing depths. This example depicts that a greater density of spherical contrast targets can enable detection of imperfect areas across the entire depth range. Similar to the example of FIG. 3, FIG. 4 also exhibits two regions 404, 406 of blurred or low-contrast sphere images, while the images of the string of 0.1 mm strings remain visible. Calibration and determination of imaging presets using only the image 402 would not have revealed the loss of contrast seen in image 400. With these regions identifiable in the image 400, the presets of the imaging device can be adjusted to improve contrast across all slice thicknesses.

Figure 5:
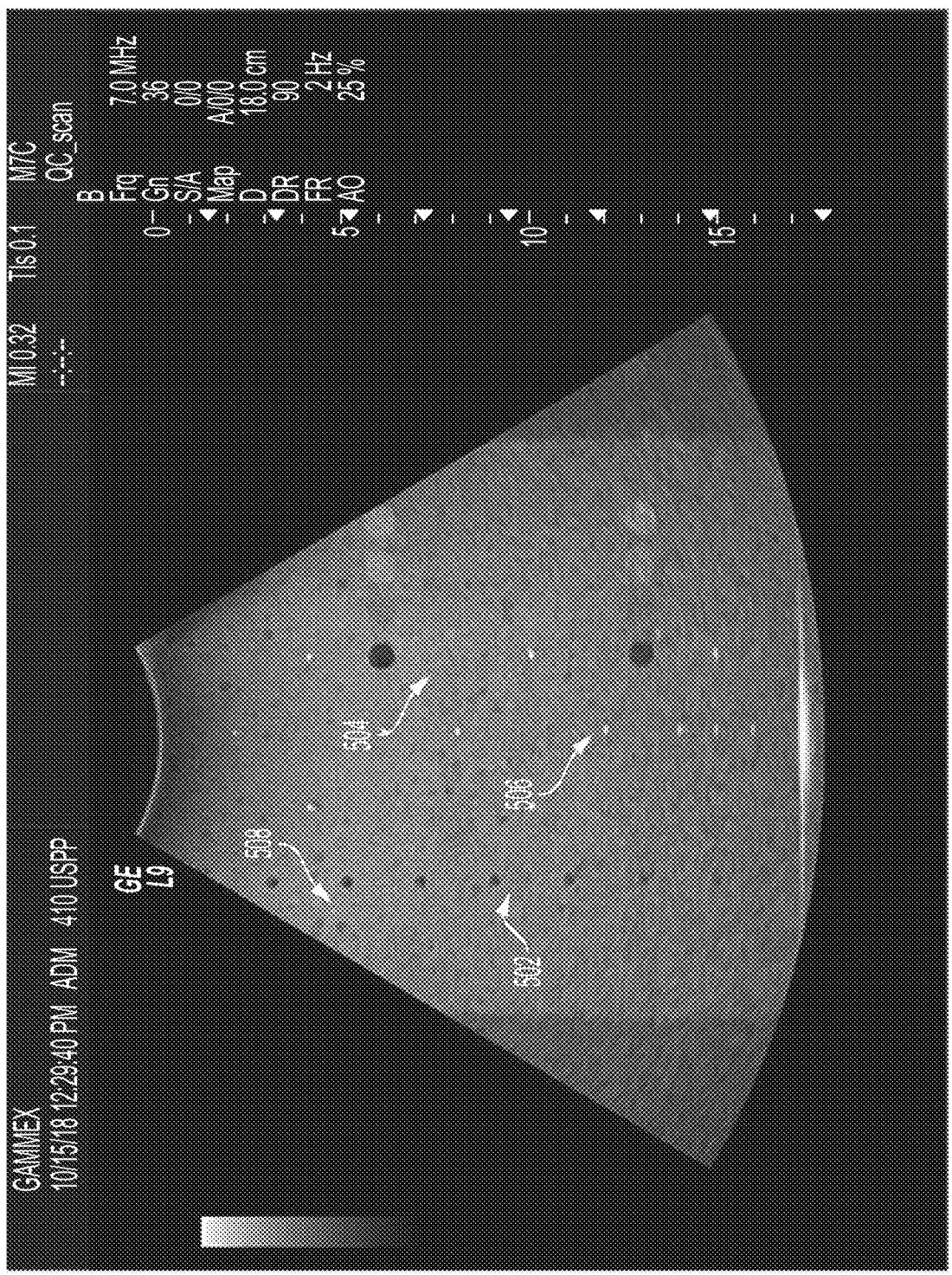
FIG. 5 is a further example an ultrasonic image of contrast targets.

FIG. 5 depicts an image 500 of an exemplary phantom that includes a combination of a column of 1 mm diameter aligned cylindrical targets 502, 0.1 mm strings (white dots)

506 that are visible across a range of depths. The image 500 also includes randomly distributed spherical SAP contrast targets 504, 508. The greater number and distribution of the SAP contrast targets reveals areas where there cylinders and strings are visible, but the SAP contrast targets are not.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A medical imaging phantom, comprising:
  a plurality of contrast targets, each contrast target of the plurality of contrast targets comprising an expanded superabsorbent polymer (SAP) sphere comprised of SAP material crosslinked with water or alcohol, the expanded SAP sphere having a predetermined size between 0.1 mm and 50 mm diameter; and
  a background material surrounding the plurality of contrast targets, wherein the background material is a tissue-mimicking gel.

2. The medical imaging phantom of claim 1, wherein the plurality of contrast targets comprises a first portion of contrast targets of the plurality of contrast targets and a second portion of contrast targets of the plurality of contrast targets, wherein the contrast targets of the first portion have at least one physical property different from at least one physical property of the contrast targets of the second portion.

3. The medical imaging phantom of claim 1, wherein the plurality of contrast targets are present in the background material at a concentration of between 10%-80% by volume.

4. The medical imaging phantom of claim 3, wherein the plurality of contrast targets are present in the background material at the concentration of between 20%-80% by volume.

5. The medical imaging phantom of claim 1, wherein the plurality of contrast targets are randomly distributed within the background material.

6. The medical imaging phantom of claim 5, wherein the plurality of contrast targets are present in the background material at a concentration of between 20%-80% by volume.

7. The medical imaging phantom of claim 1, wherein the SAP material of the expanded SAP spheres has also absorbed and formed crosslinks with the other of water or alcohol.

8. The medical imaging phantom of claim 1, wherein the water or alcohol is a solution that comprises the water or alcohol and at least one additive material to achieve the predetermined size of the expanded SAP sphere.

9. The medical imaging phantom of claim 8, wherein the additive material is sodium chloride.

10. The medical imaging phantom of claim 8, wherein the additive material is a compound that comprises at least one of sodium, calcium, potassium, or iodine.

11. The medical imaging phantom of claim 8, wherein the at least one additive material comprises a first additive material and a second additive material, wherein the first additive material is different from the second additive material.

12. The medical imaging phantom of claim 1, wherein the plurality of contrast targets are between 1 mm-4 mm in diameter.

13. The medical imaging phantom of claim 2, wherein the medical imaging phantom is configured for use as a phantom for at least one of ultrasound, computed tomography (CT), magnetic resonance imaging (MRI), or photoacoustic imaging.

14. The medical imaging phantom of claim 1, wherein the medical imaging phantom is an ultrasound phantom and the contrast targets are anechoic.

15. The medical imaging phantom of claim 1, wherein the medical imaging phantom is an ultrasound phantom and the contrast targets have a different echogenicity than the background material.

16. The medical imaging phantoms of claim 1, wherein the medical imaging phantom is an ultrasound phantom and the contrast targets are hypoechoic or hyperechoic.

17. A medical imaging phantom, comprising:
  a plurality of contrast targets, each contrast target of the plurality of contrast targets comprising an expanded superabsorbent polymer (SAP) sphere comprised of SAP material crosslinked with water or alcohol, the expanded SAP sphere having a predetermined size between 0.1 mm and 50 mm diameter; and
  a background material surrounding the plurality of contrast targets;
  wherein the background material comprises a plurality of expanded SAP spheres comprised of SAP material crosslinked with water or alcohol, wherein the plurality of expanded SAP spheres of the background material have at least one physical property different from a physical property of the expanded SAP spheres of the plurality of contrast targets.

18. A medical imaging phantom, comprising:
a plurality of contrast targets, each contrast target of the plurality of contrast targets comprising an expanded superabsorbent polymer (SAP) sphere comprised of SAP material crosslinked with water or alcohol, the expanded SAP sphere having a predetermined size between 0.1 mm and 50 mm diameter;
a background material surrounding the plurality of contrast targets; and
a solid container wherein the background material and the plurality of contrast targets are held within the solid container.

19. A method of constructing a medical imaging phantom, the method comprising:
exposing granules of superabsorbent polymer (SAP) material to water or alcohol; forming expanded SAP spheres by absorbing the water or alcohol into the granules of SAP material to form crosslinks between the hydrogen-containing liquid and the SAP material;
selecting the expanded SAP spheres based upon size;
locating the expanded SAP spheres within a background material of tissue-mimicking gel.

20. The method of claim 19, further comprising:
sorting the granules of SAP material by at least one of shape or size; and
selecting a portion of the granules of SAP material for exposure to the water or alcohol based upon the sorting.

21. The method of claim 19, wherein locating the expanded SAP particles comprises providing the expanded SAP particles in a random distribution in the background material at a concentration of 10%-80% by volume.

* * * * *